(12) United States Patent  (10) Patent No.: US 8,731,538 B2
Cook et al.  (45) Date of Patent: May 20, 2014

(54) SYSTEM, METHOD, AND APPARATUS FOR AUTOMATIC SCHEDULED SILENCING OF WIRELESS TRANSMITTERS

(75) Inventors: Charles Cook, Louisville, CO (US); Thomas Cho, Parker, CO (US)

(73) Assignee: Qwest Communications International Inc., Denver, CO (US)

( * ) Notice: Subject to any disclaimer, the term of this patent is extended or adjusted under 35 U.S.C. 154(b) by 277 days.

(21) Appl. No.: 12/552,111

(22) Filed: Sep. 1, 2009

(65) Prior Publication Data

US 2011/0053584 A1  Mar. 3, 2011

(51) Int. Cl.
*H04M 3/00* (2006.01)

(52) U.S. Cl.
USPC .......................... 455/419; 455/567; 455/456.1

(58) Field of Classification Search
USPC .................. 375/130–138; 455/413–419, 456, 455/550.1, 569; 379/201
See application file for complete search history.

(56) References Cited

U.S. PATENT DOCUMENTS

| | | | |
|---|---|---|---|
| 5,056,107 A | 10/1991 | Johnson et al. | |
| 5,553,094 A | 9/1996 | Johnson et al. | |
| 5,586,050 A | 12/1996 | Makel et al. | |
| 5,673,252 A | 9/1997 | Johnson et al. | |
| 6,172,616 B1 | 1/2001 | Johnson et al. | |
| 6,373,399 B1 | 4/2002 | Johnson et al. | |
| 6,396,399 B1 | 5/2002 | Dunlap | |
| 6,424,251 B1 | 7/2002 | Byrne | |
| 6,453,164 B1 | 9/2002 | Fuller et al. | |
| 6,907,254 B1 | 6/2005 | Westfield | |
| 6,937,868 B2 | 8/2005 | Himmel et al. | |
| 7,027,579 B1 | 4/2006 | McDonald et al. | |
| 7,142,894 B2 * | 11/2006 | Ichikawa et al. | 455/569.1 |
| 7,194,273 B2 | 3/2007 | Vaudreuil | |
| 7,231,219 B2 | 6/2007 | Curtis et al. | |
| 7,734,315 B2 | 6/2010 | Rathus et al. | |
| 7,873,351 B2 | 1/2011 | Yahagi | |
| 8,116,723 B2 | 2/2012 | Kaltsukis | |
| 8,594,738 B2 | 11/2013 | Cook et al. | |
| 2004/0058718 A1 | 3/2004 | Yu | |
| 2004/0268215 A1 * | 12/2004 | Trossen et al. | 715/500 |
| 2005/0107093 A1 | 5/2005 | Dowling | |
| 2005/0181808 A1 | 8/2005 | Vaudreuil | |
| 2006/0128375 A1 | 6/2006 | Wessel van Rooyen | |
| 2007/0254633 A1 * | 11/2007 | Mathew et al. | 455/412.1 |
| 2008/0089503 A1 * | 4/2008 | Crockett et al. | 379/201.03 |
| 2008/0101552 A1 | 5/2008 | Khan et al. | |
| 2008/0122582 A1 | 5/2008 | Baker et al. | |
| 2008/0254776 A1 * | 10/2008 | Ma | 455/414.1 |
| 2008/0274723 A1 * | 11/2008 | Hook et al. | 455/419 |
| 2008/0288787 A1 | 11/2008 | Hamilton et al. | |

(Continued)

OTHER PUBLICATIONS

U.S. Appl. No. 12/552,121; Non Final Office Action dated Jan. 5, 2012; 24 pages.

(Continued)

*Primary Examiner* — Kashif Siddiqui
(74) *Attorney, Agent, or Firm* — Swanson & Bratschun, L.L.C.

(57) ABSTRACT

A wireless telecommunication system that automatically enforces a quiet time mode of operation for a wireless handset comprises a cellular telecommunication network, and a wireless handset configured to transmit voice and data information to, and configured to receive voice and data information from the cellular telecommunication network. The wireless handset comprises a quiet time controller configured to disable the wireless handset from issuing the audible notification during scheduled quiet time periods.

11 Claims, 4 Drawing Sheets

(56) References Cited

U.S. PATENT DOCUMENTS

| | | |
|---|---|---|
| 2009/0117919 A1 | 5/2009 | Hershenson |
| 2010/0093332 A1* | 4/2010 | Chen ............................ 455/418 |
| 2010/0159943 A1 | 6/2010 | Salmon |
| 2010/0297980 A1 | 11/2010 | Alberth et al. |
| 2010/0304719 A1* | 12/2010 | Deep ............................ 455/413 |
| 2011/0053572 A1 | 3/2011 | Cook et al. |
| 2014/0045449 A1 | 2/2014 | Cook et al. |

OTHER PUBLICATIONS

US 7,493,113, 02/2009, Arend et al. (withdrawn).

U.S. Appl. No. 12/552,121; Final Rejection dated May 10, 2012; 44 pages.

U.S. Appl. No. 12/552,121; Final Rejection dated Jun. 7, 2013 49 pages.

U.S. Appl. No. 12/552,121; Interview Summary dated Jun. 20, 2013; 2 pages.

U.S. Appl. No. 12/552,121: Notice of Allowance dated Jul. 23, 2013; 38 pages.

U.S. Appl. No. 12/552,121; Non-Final Rejection dated Jan. 2, 2013; 52 pages.

U.S. Appl. No. 12/552,121; Issue Notification dated Nov. 6, 2013; 1 page.

U.S. Appl. No. 14/055,677; Non-Final Rejection dated Jan. 31, 2014; 49 pages.

* cited by examiner

SYSTEM, METHOD, AND APPARATUS FOR AUTOMATIC SCHEDULED SILENCING OF WIRELESS TRANSMITTERS

RELATED APPLICATION

This application is related to U.S. patent application Ser. No. 12/552,121 (now U.S. Pat. No. 8,594,738), filed on Sep. 1, 2009 by Charles Cook, and entitled "SYSTEM, METHOD AND APPARATUS FOR AUTOMATIC LOCATION-BASED SILENCING OF WIRELESS TRANSCEIVERS", which is herein incorporated by reference in its entirety.

FIELD

The present disclosure relates generally to wireless transceivers, such as cellular telephones. In particular, but not by way of limitation, the present disclosure relates to systems, methods and apparatuses for automatically silencing a wireless transceiver at predetermined times.

BACKGROUND

The use of wireless communication devices, such as cellular and personal communications system (PCS) telephones, pagers, personal digital assistants (PDAs), smartphones and the like has become ubiquitous. Such devices offer many advantages including the ability to establish communication at almost any location and at almost any time. Thus, wireless users can talk with friends and colleagues, receive updates on the weather or the stock market, send and receive e-mail, receive audible alarms for important events, and many other useful activities.

While wireless communication brings many benefits, there are occasionally some drawbacks. The ringing of a wireless telephone is an unwanted event at public settings such as performances, meetings, movies, plays, lectures, concerts, religious services and the like. Portable wireless devices may create a distraction to learning in schools. Operation of a wireless handset may create a hazardous distraction to vehicle operators. Operation of various wireless devices may also interfere with the safe operation of commercial aircraft and life-supporting medical equipment. Often users of wireless handsets forget to turn off, silence or otherwise modify the notification capabilities of their wireless handsets when in circumstances where such actions are appropriate or mandated by law.

SUMMARY OF THE INVENTION

Illustrative embodiments are shown in the drawings and summarized below. These and other embodiments are more fully described in the Detailed Description section. It is to be understood, however, that there is no intention to limit the scope of the claims to the embodiments and examples described in this Summary or in the Detailed Description. One skilled in the art can recognize that there are numerous modifications, equivalents, and alternative constructions that fall within the spirit and scope of this disclosure as expressed in the claims.

One embodiment includes a wireless telecommunication system that automatically enforces a quiet time mode of operation. The system comprises a cellular telecommunication network, and a wireless handset configured to transmit voice and data information to, and configured to receive voice and data information from the cellular telecommunication network. The wireless handset is configured to issue an audible notification upon the occurrence of one or more events. The wireless handset further comprises a quiet time controller configured to disable the wireless handset from issuing the audible notification during a predetermined quiet time period.

Another embodiment includes a wireless handset that automatically silences itself upon the occurrence of a certain event. The wireless handset comprises a clock configured to monitor date and time, an audible notifier configurable to issue an audible alert upon the occurrence of a plurality of events, and a quiet time controller coupled to the audible notifier. The quiet time controller is configured to disable the wireless handset from issuing the audible alert during a predetermined quiet time period. In another embodiment the wireless handset further comprises a programmable calendar coupled to the clock and to the quite time controller. The programmable calendar is configured to identify the predetermined quiet time period to the quiet time controller.

Another embodiment includes a method for automatically adjusting an operational mode of a wireless handset, where the method comprises designating a quiet time in a calendar operating in the wireless handset, and defining an action for the wireless handset to automatically initiate at the beginning of the designated quiet time.

In another embodiment, an external beacon is utilized to signal a wireless handset that it needs to enter into a quiet mode of operation. The beacon could be a radio beacon, sub-audible audio, or some other mechanism that is not audible to the human ear. In addition a beacon operating in the light portion of the spectrum may be utilized rather than the radio or sound wave portion of the spectrum.

The above-described objects and features as well as other objects, features, and advantages of the present disclosure are readily apparent from the following detailed description when taken in connection with the accompanying drawings.

BRIEF DESCRIPTION OF THE DRAWINGS

Various objects and advantages of the present disclosure are apparent and more readily appreciated by reference to the following Detailed Description and to the appended claims when taken in conjunction with the accompanying Drawings, wherein:

DETAILED DESCRIPTION

Figure 1:
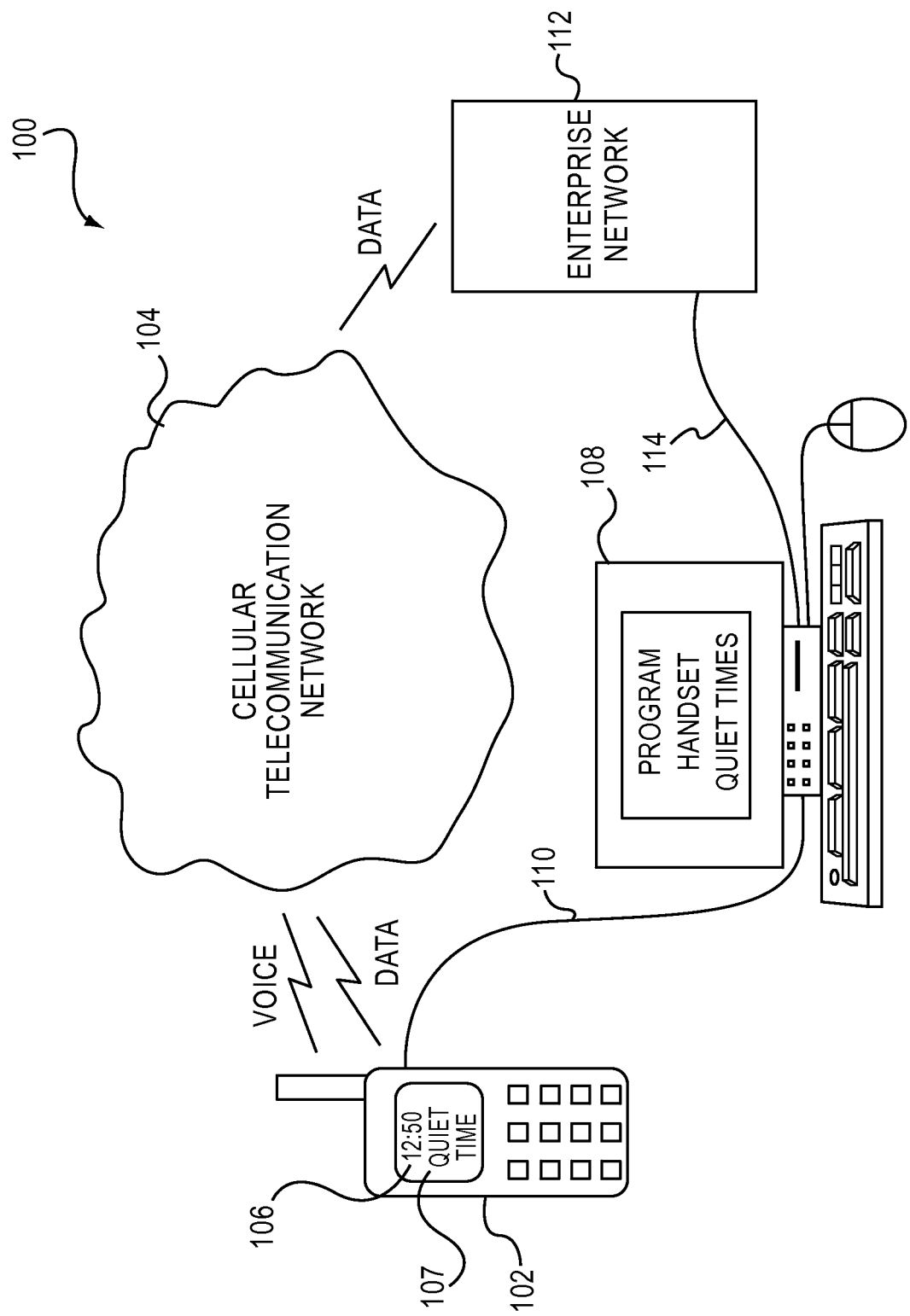
FIG. 1 is an architectural diagram illustrating a wireless telecommunications system.

Reference is now directed to the drawings, where like or similar elements are designated with identical or corresponding reference numerals throughout the several views.

Referring to FIG. 1, an architectural diagram illustrating a wireless telecommunications silencing system 100 according to one embodiment is shown. A wireless transceiver (referred to herein as "cell phone," "smartphone," "handheld device" or "wireless handset") 102 communicates wirelessly with a cellular telecommunication network 104 that is capable of transmitting voice and data information. The cell phone 102 includes, among other features, a clock 106 that keeps track of, and indicates the date and time of day on a display screen 107. A computer 108 is connected to the cell phone 102 by, for example, a standard universal serial bus (USB) cable 110. The computer 108 is also connected to an enterprise network 112 by, for example, a standard Ethernet connection 114. The enterprise network 112 is configured to transmit data to the cellular telecommunication network 104.

One skilled in the art will readily appreciate that the illustrated arrangement of the above-described system components, as well as the means by which those components interconnect, are provided as an illustrative example. Accordingly, the components can be configured differently than as depicted in an actual implementation, and the components can be connected in a variety of ways without changing the basic operation of the system 100. For example, the cell phone 102 may be connected to the computer 108 wirelessly or by infrared communication protocol. Similarly, the computer 108 may be connected to the enterprise network 112 by wireless communications or fiber optic connection. Computer 108 may include one or more of the components described in conjunction with FIG. 4.

The cell phone 102 has the ability to be programmed to operate in different modes for signaling to the user that a phone call is being received or that another type of event has occurred, such as, for example, the arrival of a new e-mail, voice mail or text message or that the time for a scheduled event has arrived. Often the mode of operation for such a condition, especially for signaling an incoming phone call, is to provide an audible sound, such as a ring tone, to alert the user of the cell phone 102. Other modes of operating upon receipt of an incoming call include without limitation a vibrate mode, where the cell phone 102 vibrates to signal to the user (primarily through the sense of feel) that a call has been received, or an other event has occurred, without disturbing others that are present, and a visual-only mode, where the user is not notified by audible or vibratory means that the call has been received; instead notification of an incoming call is provided only on the display screen 107 of the cell phone 102.

A more personalized mode of signaling a user of a cell phone 102 that a call is received includes the ability to program a specific ring tone or action when a particular individual calls or when a defined class of callers call. For example, the cell phone 102 may be programmed to play a unique ring tone when it receives a call from members of the user's family or from the school at which the user's children attend.

Users of cell phones 102 often use electronic calendar programs to manage their day-to-day schedules. Some such calendar programs operate directly on the cell phone 102, while other calendar programs operate on the computer 108; such calendar programs are configured to synchronize with calendar functions of certain cell phones 102. For example, Microsoft Corporation offers a personal information management software program called Outlook™ that permits a user to, among other things, manage his or her schedule on a standard personal computer 108. Although often used mainly as an e-mail application, Outlook also includes a calendar, task manager, contact manager, note taking, a journal and web browsing. Outlook is also able to synchronize with certain cell phones 102, often referred to as "smartphones," such as for example, the line of cell phones 102 offered by Research In Motion, Ltd. under the brand name BlackBerry™.

An important function of the smartphone type of cell phone 102 is its ability to synchronize data with a personal computer 108. This allows up-to-date contact information stored in a software program such as Microsoft Outlook or ACT!™ to update a corresponding database on the cell phone 102. Such data synchronization ensures that the cell phone 102 has an accurate list of contacts, calendar appointments and e-mail, allowing users to access the same information on the cell phone 102 as is on the host computer. In the embodiment of FIG. 1, synchronization of data between the cell phone 102 and personal computer 108 transpires by way of a direct universal serial bus (USB) cable 110, although wireless or other network-based synchronization is also contemplated.

Synchronization of data prevents loss of information stored on the cell phone 102 in case the cell phone 102 is lost, stolen, or destroyed. Another advantage is that data is usually input more quickly and easily on a computer 108, since text input via a touch screen or small keyboard is not optimal. Transferring data to a cell phone 102 via the computer 108 is therefore quicker than having to manually input all data on the wireless handset 102.

Synchronization is often accomplished through synchronization software provided with the wireless handset 102, such as for example HotSync Manager™, which comes with Palm OS™ brand handhelds 102, Microsoft ActiveSync™ for older versions of Windows™ or Windows Mobile Device Center™ on Windows Vista™, which comes with Windows Mobile™ cell phones 102.

These programs allow the cell phone 102 to be synchronized with a personal information manager. This personal information manager may be an outside program or a proprietary program. For example, the BlackBerry™ brand smartphone 102 comes with the Desktop Manager™ program that can synchronize to both Microsoft Outlook™ and ACT!™. Other cell phones 102 come only with their own proprietary software. For example, some early Palm OS™ smartphones 102 came only with Palm Desktop™ while later Palm smartphones 102 such as the Treo™ 650 have the built-in ability to sync to Palm Desktop™ or Microsoft Outlook™, while Microsoft's ActiveSync™ and Windows Mobile Device Center™ only synchronize with Microsoft Outlook™ or a Microsoft Exchange™ server.

Third-party synchronization software is also available for many cell phones 102 from companies like Intellisync™ and CompanionLink™. This software synchronizes cell phones 102 to other personal information managers which are not supported by the manufacturers, such as GoldMine™ and Lotus Notes™.

If the user's computer is connected to an enterprise network 112, then it is also possible for the user's computer 108 to synchronize data, such as calendar information, with the user's cell phone 102 by transmission of data from the enterprise server 112 to the cell phone 102 over the cellular telecommunication network 104. For example, the Blackberry™ brand of products and services offer BlackBerry™ handhelds 102 that are integrated into an organization's deployed personal information management system through a software package called "BlackBerry Enterprise Server" (BES). Versions of BES are available for Microsoft Exchange, Lotus Domino and Novell GroupWise. While individual users may be able to use a wireless provider's synchronization services without having to install BES themselves, organizations with multiple users usually run BES on their own network. Additionally, some third-party companies provide hosted BES solutions as well. Thus, users of cell phones 102 are able to easily synchronize, store and update their personal information on their cell phones 102, including their calendar information.

Figure 2:
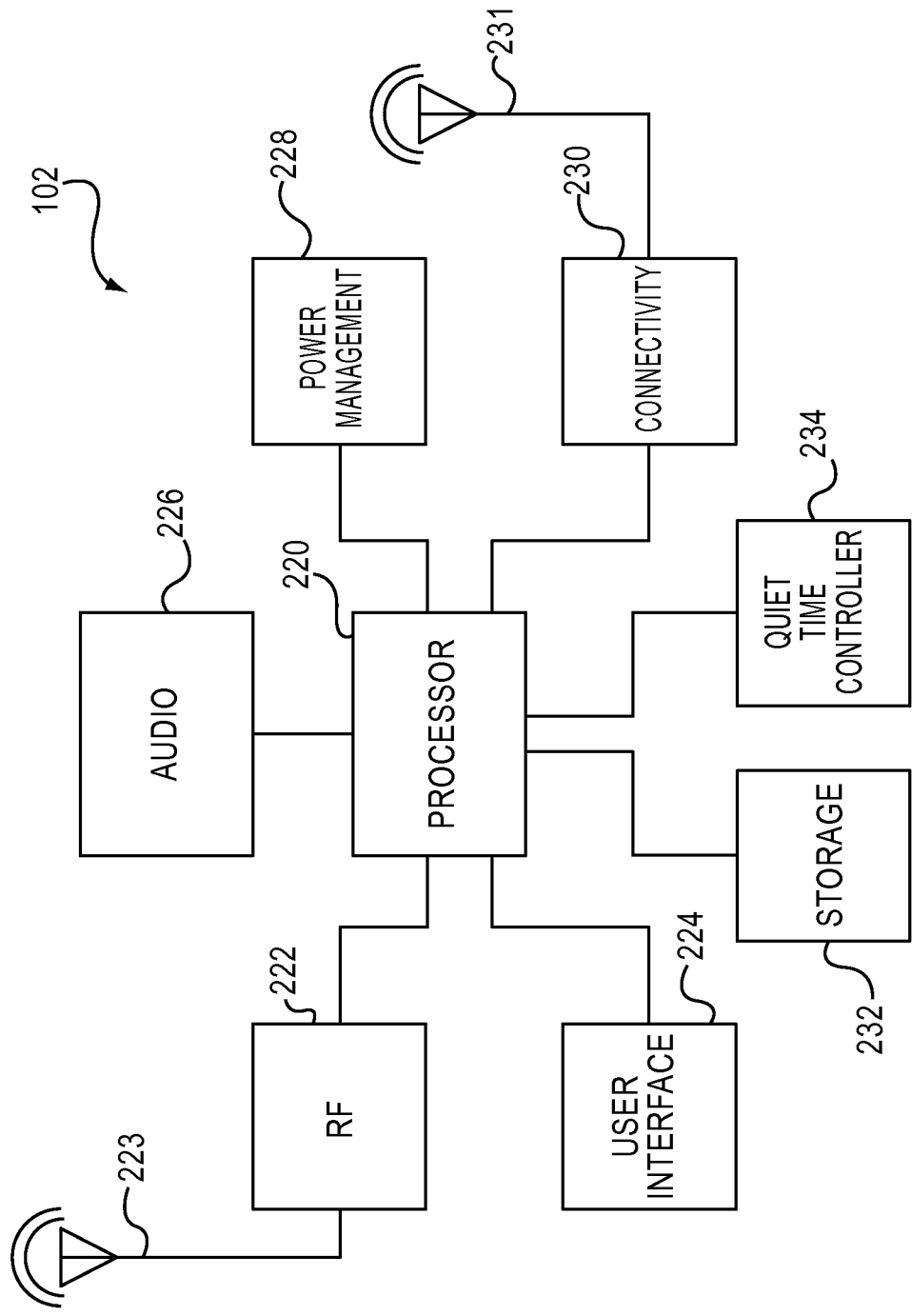
FIG. 2 is a block diagram illustrating the functional components of a wireless handset according to one aspect.

Referring to FIG. 2, disclosed is a functional block diagram of a typical cell phone 102 as depicted in FIG. 1. At the heart of the cell phone 102 is a processor 220 that controls the overall operation of the cell phone 102. Coupled to the processor 220 is one or more components 22 configured to transmit and to receive radio frequency (RF) signals according to one or more protocols such as GSM, CDMA and WCDMA as well as a user identification and authentication device, such as a SIM card. One or more antennas 223 are coupled to the RF components 222 to transmit and to receive RF signals.

A user interface 224 is also coupled to the processor 220. The user interface typically comprises a display, such as a liquid crystal display, a keypad and a controller to manage the display.

An audio device 226 is coupled to the processor 220. The audio device typically comprises a speaker, an earpiece jack, a headset jack and/or an audio controller.

Other components coupled to the processor 220 comprise a power management functional block 228 of the cell phone 102 depicted in FIG. 2. The power management block 228 typically comprises one or more of a rechargeable battery, such as a lithium-ion battery, a power management component to manage battery power, and a Wi-Fi power management controller.

The connectivity block 230, coupled to the processor 220, comprises a variety of components configured to enable the cell phone 102 to connect, by various protocols, to numerous external networks and other functions, such as the power grid. The connectivity block 230 in one embodiment comprises a micro USB port (used for, among other things, recharging the battery and synchronizing or transferring data to and from the user's computer 108), a slot for removable storage of data, such as a MicroSD slot, a controller to manage the USB port and the storage slot, a Bluetooth transceiver, a GPS receiver, a Wi-Fi transceiver, and one or more Wi-Fi power amplifiers. The Wi-Fi power amplifiers are coupled to one or more antennas 231.

A storage block 232, coupled to the processor 220, in one embodiment comprises one or more components including dynamic random access memory.

A quiet time controller 234 is also coupled to the processor 220. The quiet time controller 234 provides the functional capability to allow a user to designate specific dates and times as "quiet times." When so designated, the quiet time controller 234 will automatically change the notification mode of operation of the cell phone 102 to a quiet time mode of operation. In one embodiment, a calendar feature is employed by the user of the cell phone 102 to designate quiet times of operation. For example, a student might designate weekdays between the hours of 8:00 am and noon and between 1:00 pm and 3:30 as quiet times, so as to automatically silence the student's cell phone 102 during regularly scheduled class times.

In one embodiment, the quiet time controller configures a quiet time mode of operation whereby the audible notification feature of the cell phone 102 is fully disabled. In another embodiment, the quiet time controller configures a quiet time mode of operation whereby the volume of the audible notification feature of the cell phone 102 is set to the minimum level. In another embodiment, the quiet time controller configures a quiet time mode of operation whereby the notification feature of the cell phone 102 is set to a visual-only mode. In another embodiment, the quiet time controller configures a quiet time mode of operation whereby the notification feature of the cell phone 102 is set to vibrate. In another embodiment, the quiet time controller configures a quiet time mode of operation whereby the cell phone is powered down at the beginning of the scheduled quiet time period. Once the scheduled quiet time period is ended, the cell phone 102 automatically powers itself up and resumes standard operation. In another embodiment, the user of the cell phone 102 can personally configure the quiet time mode of operation.

Another embodiment provides more flexibility in the programming of the quiet time mode of operation. In some cases, the user might want the cell phone 102 to automatically power down. For example, when the user is scheduled to fly on an airplane, the user might set the scheduled flight time as a quiet time that powers off the cell phone 102 completely, and powers it up once the scheduled flight time is over. In other situations, the user will prefer to simply disable the audible notification feature of the cell phone 102. One such situation might be when the user is scheduled to attend a meeting that should not be interrupted. In other circumstances, the user might wish to allow a certain caller, such as an administrative assistant or a baby sitter, to interrupt, but no others. In such a case, the user may configure the quiet time controller to allow an audible notification for an allowed caller.

In another embodiment, the quiet time controller 234 may be configured to identify a plurality of quiet time conditions to permit the user to quickly set the desired conditions for various scheduled events the user might encounter. For example, the quiet time controller may be configured to recognize an airplane quiet time profile, a meeting quiet time profile, a night quiet time profile, a concert quiet time profile, a religious services quiet time, etc.

One skilled in the art will readily appreciate that the illustrated arrangement of the components in FIG. 2 comprises a logical allocation of functions; thus the blocks and components illustrated and described herein can be combined or further separated in an actual implementation, and the components can be connected in a variety of ways without changing the basic operation of the cell phone 102.

Figure 3:
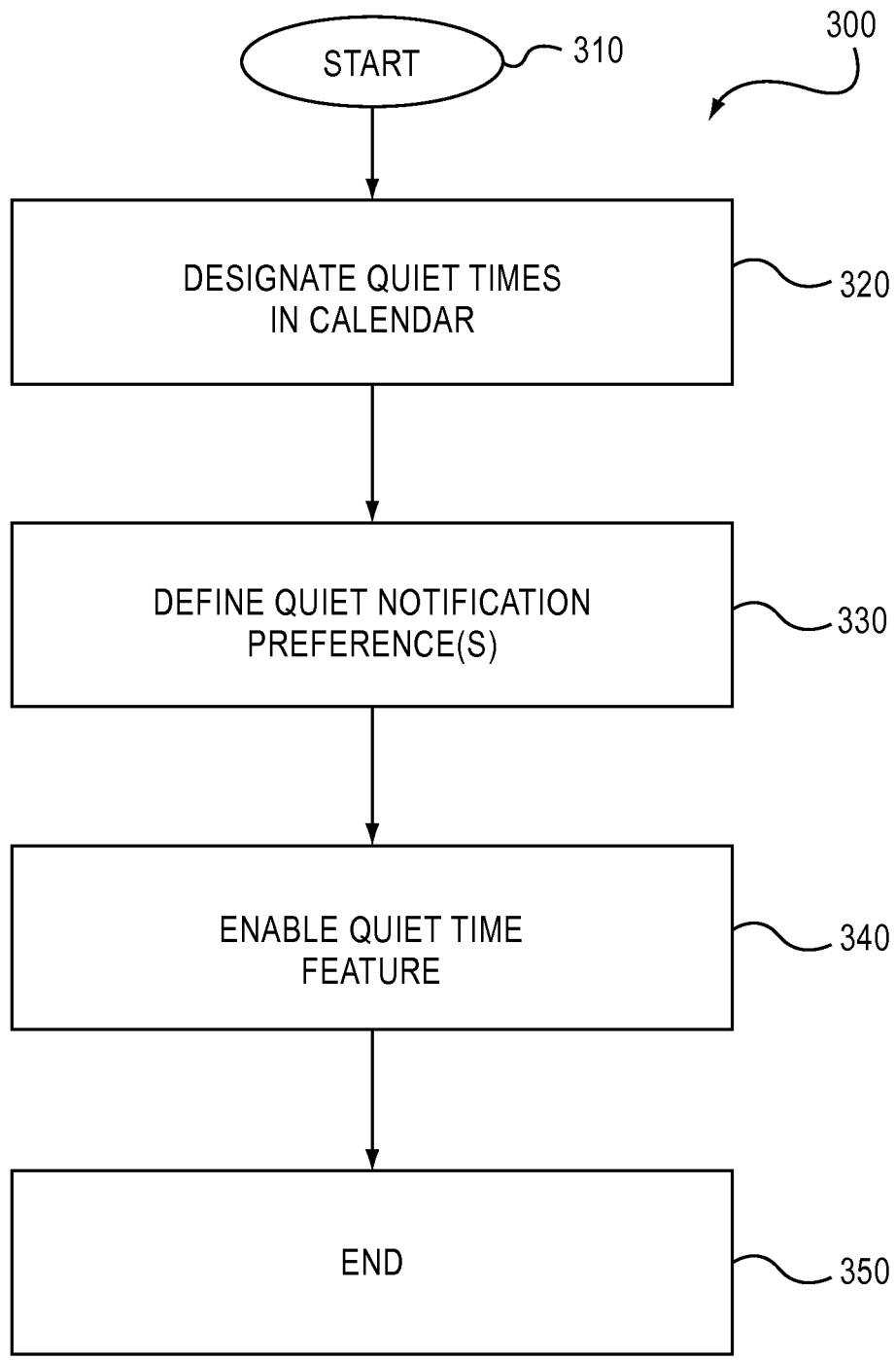
FIG. 3 is a flow chart illustrating a method of automatically silencing a wireless headset.

Referring to FIG. 3, a flow chart 300 illustrates a method for practicing the disclosed wireless telecommunication silencing system according to one embodiment. The method begins at block 310 where the user accesses the quiet time feature either on the cell phone 102 directly or on a computer 108 configured to synchronize data with the cell phone 102. Next, at block 320, the user designates specific quiet times in the calendar feature of the cell phone 102. At block 330 the user defines the actions to be taken by the quiet time controller 234 at the scheduled quiet time. At block 340, the user enables the quiet time feature to operate, thereby ensuring that the desired change in operational mode will occur at the designated quiet times. Finally, at block 350, the user exits the quiet time feature.

Figure 4:
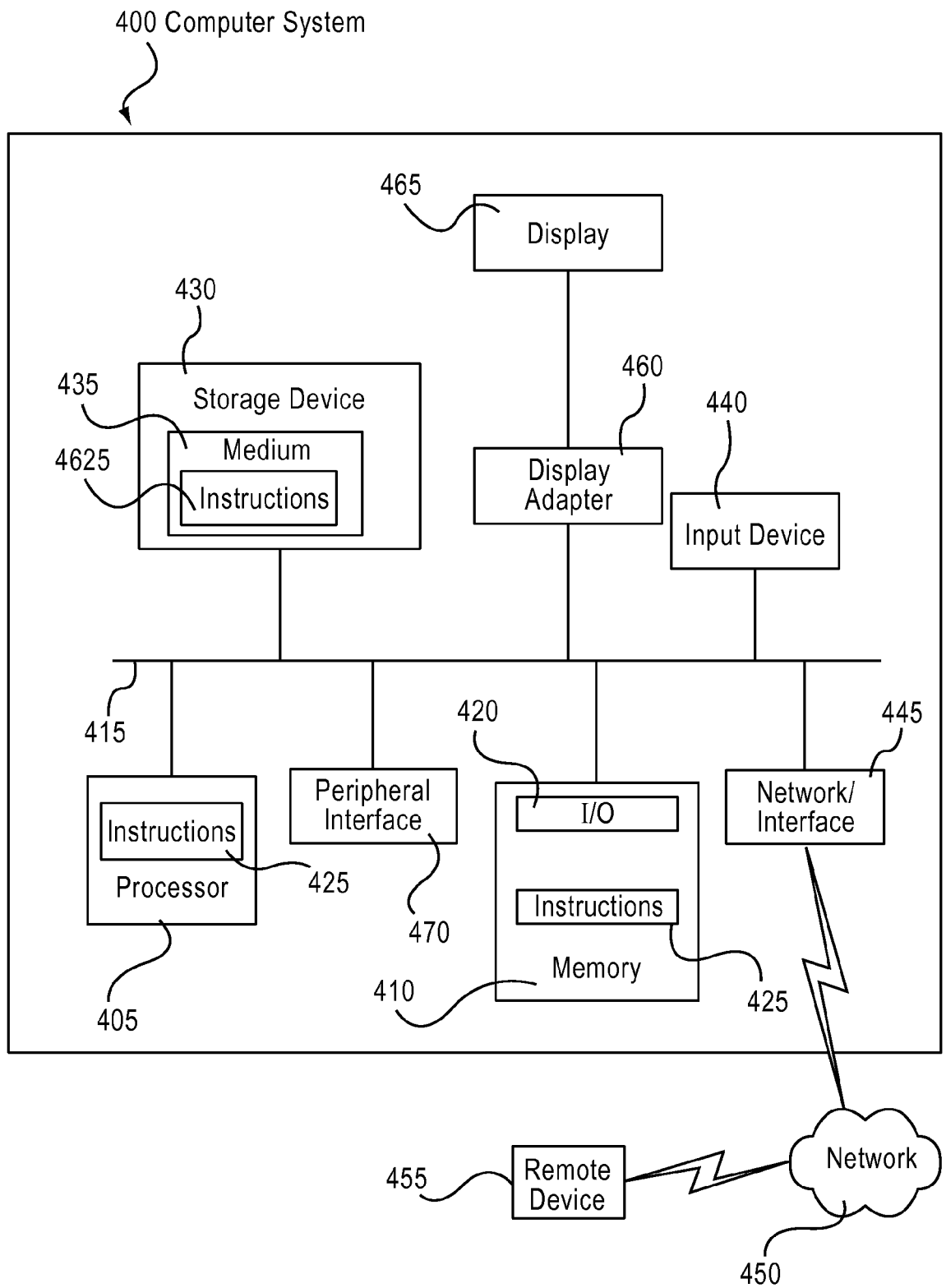
FIG. 4 is one specific example of an architecture diagram for a computer system used in conjunction with various aspects of the inventions described herein

FIG. 4 shows a diagrammatic representation of one embodiment of a machine in the exemplary form of a computer system 400 within which a set of instructions for causing a device as disclosed herein to perform any one or more of the aspects and/or methodologies of the present disclosure. Computer system 400 includes a processor 405 and a memory 410 that communicate with each other, and with other components, via a bus 415. Bus 415 may include any of several types of bus structures including, but not limited to, a memory bus, a memory controller, a peripheral bus, a local bus, and any combinations thereof, using any of a variety of bus architectures.

Memory 410 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 420 (BIOS), including basic routines that help to transfer information between elements within computer system 400, such as during start-up, may be stored in memory 410. Memory 410 may also include (e.g., stored on one or more machine-readable media) instructions (e.g., software) 425 embodying any one or more of the aspects and/or methodologies of the present disclosure. In another example, memory 410 may further include any number of program modules including, but not limited to, an operating system, one or more application programs, other program modules, program data, and any combinations thereof.

Computer system 400 may also include a storage device 430. Examples of a storage device (e.g., storage device 430) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 430 may be connected to bus 415 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 430 may be removably interfaced with computer system 400 (e.g., via an external port connector (not shown)). Particularly, storage device 430 and an associated machine-readable medium 435 may provide nonvolatile and/or volatile storage of machine-readable instructions, data structures, program modules, and/or other data for computer system 400. In one example, software 425 may reside, completely or partially, within machine-readable medium 435. In another example, software 425 may reside, completely or partially, within processor 405. Computer system 400 may also include an input device 440. In one example, a user of computer system 400 may enter commands and/or other information into computer system 400 via input device 440. Examples of an input device 440 include, but are not limited to, an alpha-numeric input device (e.g., a keyboard), a pointing device, a joystick, a game-pad, an audio input device (e.g., a microphone, a voice response system, etc.), a cursor control device (e.g., a mouse), a touch-pad, an optical scanner, a video capture device (e.g., a still camera, a video camera), touch-screen, and any combinations thereof. Input device 440 may be interfaced to bus 415 via any of a variety of interfaces (not shown) including, but not limited to, a serial interface, a parallel interface, a game port, a USB interface, a FIREWIRE interface, a direct interface to bus 415, and any combinations thereof.

A user may also input commands and/or other information to computer system 400 via storage device 430 (e.g., a removable disk drive, a flash drive, etc.) and/or a network interface device 445. A network interface device, such as network interface device 445 may be utilized for connecting computer system 400 to one or more of a variety of networks, such as network 450, and one or more remote devices 455 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 450, may employ a wired and/or a wireless mode of communication. In general, any network topology may be used. Information (e.g., data, software 425, etc.) may be communicated to and/or from computer system 400 via network interface device 445.

Computer system 400 may further include a video display adapter 460 for communicating a displayable image to a display device, such as display device 465. A display device may be utilized to display any number and/or variety of indicators related to the use of quiet mode operations, as discussed above. Examples of a display device include, but are not limited to, a liquid crystal display (LCD), a cathode ray tube (CRT), a plasma display, and any combinations thereof. In addition to a display device, a computer system 400 may include one or more other peripheral output devices including, but not limited to, an audio speaker, a printer, and any combinations thereof. Such peripheral output devices may be connected to bus 415 via a peripheral interface 470. Examples of a peripheral interface include, but are not limited to, a serial port, a USB connection, a FIREWIRE connection, a parallel connection, and any combinations thereof. In one example an audio device may provide audio related to data of computer system 400 (e.g., data representing an indicator related to the use of quiet mode operations).

A digitizer (not shown) and an accompanying stylus, if needed, may be included in order to digitally capture freehand input. A pen digitizer may be separately configured or coextensive with a display area of display device 465. Accordingly, a digitizer may be integrated with display device 465, or may exist as a separate device overlaying or otherwise appended to display device 465.

Other aspects include the following:

The events that trigger a quiet time may be selected from a phone call, a voice mail message, an e-mail message, a short message service (SMS) message, a real-time text-based communication, a messaging (IM) communication, a scheduled event, establishment of a connection with the cellular telecommunication network, loss of connection with the cellular telecommunication network, a past-due notice of a scheduled event, a low-power notice, and a reminder notification.

The wireless telecommunication system may also include a computer coupled to the wireless handset configured to synchronize a plurality calendar data with the wireless handset.

The wireless telecommunication system may also include an enterprise network coupled to the computer and coupled to the cellular telecommunication network, where the enterprise network is configured to synchronize the plurality of calendar data with the wireless headset by way of the cellular telecommunication network.

The quiet mode of operation of the wireless handset may be adapted to be overridden for a discrete period of time, after which the wireless handset reverts back to the quiet mode of operation.

In another embodiment, a wireless handset that automatically initiates a quiet time operational mode may comprise a clock configured to monitor date and time, an alarm configurable to issue an alert upon the occurrence of one or more of a plurality of events, a quiet time controller, coupled to the alarm, the quiet time controller configured to disable the wireless handset from issuing the alert during a predetermined quiet time period, and a programmable calendar, coupled to the clock and to the quite time controller, where the programmable calendar is configurable to identify the predetermined quiet time period to the quiet time controller.

In another embodiment, the wireless handset is further configured to disable the wireless handset from receiving incoming calls during a predetermined quiet time period.

In another embodiment, the wireless handset is further configured to enable the wireless handset to receive an incoming emergency call during the predetermined quiet time period.

In another embodiment, the wireless handset of claim is further configured to enable the wireless handset to redirect the incoming emergency call to a public safety answering point (PSAP) by way of the cellular telecommunication network.

In another embodiment, the wireless handset is further configured to disable the wireless handset from initiating outgoing calls during the predetermined quiet time period.

In another embodiment, the wireless handset is further configured to enable the wireless handset to initiate outgoing emergency calls during a predetermined quiet time period.

In another embodiment, the wireless handset is further configured to enable the wireless handset to direct the outgoing emergency call to a public safety answering point (PSAP).

In another embodiment, a wireless handset that automatically initiates a quiet time operational mode comprises a clock configured to monitor date and time, a notifier configurable to issue one or more alerts upon the occurrence of a plurality of events, a quiet time controller, coupled to the notifier, the quiet time controller configured to initiate a quiet time operational mode of notification at a predetermined quiet time period, and a programmable calendar, coupled to the clock and to the quite time controller, where the programmable calendar is configurable to identify the predetermined quiet time period to the quiet time controller.

In another embodiment, the quiet time operational mode of notification comprises disabling an audible notification capability of the wireless handset.

In another embodiment, the quiet time operational mode of notification comprises lowering a volume level of the audible notification feature of the wireless handset.

In another embodiment, the quiet time operational mode of notification comprises setting a notification mode to visual-only.

In another embodiment, the quiet time operational mode of notification comprises setting a notification mode to vibrate.

In another embodiment, the quiet time operational mode of notification comprises shutting down the wireless handset.

In another embodiment, the quiet time operational mode of notification comprises disabling connectivity.

In another embodiment, the signal places the handset into a quiet mode of operation for a pre-determined length of time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wireless telecommunication system adapted to implement a quiet time mode of operation, the system comprising:
    a cellular telecommunication network;
    a wireless handset configured to transmit voice and data information to, and configured to receive voice and data information from, the cellular telecommunication network, wherein the wireless handset is configurable to selectively issue an audible notification upon the occurrence of one or more of a plurality of events; and
    a quiet time controller configured recognize a plurality of quiet time profiles, the plurality comprising an airplane quiet time profile and a night quiet time profile, to identify a quiet time condition and to disable the wireless handset from issuing the audible notification during a predetermined quiet time period, wherein disabling the wireless handset comprises powering down the wireless handset during the predetermined quiet time period, and wherein the quiet time controller is configured to power up the wireless handset, such that the wireless handset resumes standard operation, when the predetermined quiet time period has ended.

2. The wireless telecommunication system of claim 1 wherein the quiet time controller is further configured to enable the wireless handset to issue the audible notification during a predetermined non-quiet time period.

3. The wireless telecommunication system of claim 2 wherein the data information transmitted from the cellular telecommunication network to the wireless handset includes date and time information, and wherein the quiet time controller is further configured to disable the wireless handset based on the date and time information transmitted from the cellular telecommunication network to the wireless handset.

4. The wireless telecommunication system of claim 2 wherein the wireless handset further comprises a clock to monitor date and time information.

5. The wireless telecommunication system of claim 1 wherein the wireless handset further comprises a programmable calendar, coupled to the quiet time controller, where the programmable calendar is configurable to identify the predetermined quiet time period to the quiet time controller.

6. The wireless telecommunication system of claim 2 wherein the data information transmitted from the cellular telecommunication network to the wireless handset originate from a signal beacon.

7. A wireless telecommunication system that automatically enforces a quiet mode of operation, the system comprising:
    a cellular telecommunication network;
    a wireless handset configured to transmit voice and data information to, and configured to receive voice and data information from the cellular telecommunication network; and
    a quiet time controller configured to recognize a plurality of quiet time profiles, the plurality comprising an airplane quiet time profile and a night quiet time profile, to identify a quiet time condition and to adjust the wireless handset to operate in a quiet mode during a predetermined quiet time period, wherein adjusting the wireless handset comprises powering down the wireless handset during the predetermined quiet time period, and wherein the quiet time controller is configured to power up the wireless handset, such that the wireless handset resumes standard operation, when the predetermined quiet time period has ended.

8. The wireless telecommunication system of claim 7 wherein the quiet time controller is further configured to allow a user to override the quiet mode of operation of the wireless handset.

9. The wireless telecommunication system of claim 7 wherein the wireless handset comprises a predefined user key sequence function by which the quiet mode of operation of the wireless handset is overridden.

10. A computer implemented method for automatically adjusting an operational mode of a wireless handset, the method comprising:
    designating a quiet time period in a calendar operating in the wireless handset; and
    defining an action for the wireless handset to automatically initiate at the beginning of the designated quiet time, wherein the defined action comprises powering down the wireless handset during the designated quiet time period, and wherein a quiet time controller is configured to recognize a plurality of quiet time profiles, the plurality comprising an airplane quiet time profile and a night quiet time profile, to identify a quiet time condition, and to power up the wireless handset, such that the wireless handset resumes standard operation, when the designated quiet time period has ended.

11. The method of claim 10 wherein defining an action for the wireless handset to automatically initiate at the beginning of the designated quiet time further comprises defining an action for the wireless handset to automatically initiate at the conclusion of the designated quiet time.

\* \* \* \* \*